United States Patent [19]

Pfeiffer et al.

[11] Patent Number: 5,109,330
[45] Date of Patent: Apr. 28, 1992

[54] MULTIPROCESSOR SYSTEM WITH SEQUENTIAL PRIORITIZED COMMON MEMORY ACCESS PREVENTING MEMORY UPDATE ACCESS BY ALL PROCESSORS EXCEPT MAIN PROCESSOR

[75] Inventors: Klaus Pfeiffer, Gilching; Wolfgang Kosler, Munich; Erich Paulmichl, Gauting, all of Fed. Rep. of Germany

[73] Assignee: Siemens Aktiengesellschaft, Munich, Fed. Rep. of Germany

[21] Appl. No.: 29,685

[22] Filed: Mar. 24, 1987

[30] Foreign Application Priority Data

Apr. 2, 1986 [DE] Fed. Rep. of Germany ....... 3610995

[51] Int. Cl.$^5$ .................. G06F 13/30; G06F 9/312
[52] U.S. Cl. ................... 395/425; 364/228.1;
364/229; 364/230; 364/230.1; 364/240;
364/241.2; 364/242.6; 364/242.9; 364/244;
364/246; 364/246.2; 364/246.8; 364/926.9;
364/926.91; 364/927.97; 364/927.92;
364/931.46; 364/931.4; 364/942.3; 364/942.6;
364/935.4; 364/935.41; 364/DIG. 1; 364/DIG. 2

[58] Field of Search ... 364/200 MS File, 900 MS File

[56] References Cited

U.S. PATENT DOCUMENTS

| | | | |
|---|---|---|---|
| 3,943,493 | 3/1976 | Shelton | 364/200 |
| 4,000,485 | 12/1976 | Barlow | 364/200 |
| 4,101,959 | 7/1978 | Domike | 364/200 |
| 4,186,438 | 1/1980 | Benson | 364/200 |
| 4,245,306 | 1/1981 | Besemer et al. | 364/200 |
| 4,266,271 | 5/1981 | Chamoff | 364/200 |
| 4,296,463 | 10/1981 | Dalboussiere et al. | 364/200 |
| 4,363,094 | 12/1982 | Kaul et al. | 364/200 |
| 4,363,094 | 12/1982 | Kaul | 364/200 |
| 4,374,414 | 2/1983 | Comfort et al. | 364/200 |
| 4,396,984 | 8/1983 | Videki, II | 364/200 |
| 4,468,750 | 8/1984 | Chamoff | 364/900 |
| 4,482,950 | 11/1984 | Oshkhunian | 364/200 |
| 4,484,273 | 11/1984 | Stiffler et al. | 364/200 |
| 4,488,217 | 12/1984 | Binder | 364/200 |
| 4,499,538 | 2/1985 | Finger et al. | 364/200 |
| 4,530,069 | 7/1985 | Desrochers | 364/900 |
| 4,587,609 | 5/1986 | Boudreau | 364/200 |
| 4,590,554 | 5/1986 | Glazer | 364/200 |
| 4,603,385 | 7/1986 | Mueller | 364/200 |
| 4,604,685 | 8/1986 | Brown et al. | 364/200 |
| 4,631,667 | 12/1986 | Zulian | 364/200 |
| 4,635,189 | 1/1987 | Kendall | 364/200 |
| 4,665,484 | 5/1987 | Namba | 364/200 |
| 4,669,056 | 5/1987 | Waldeckev | 364/900 |
| 4,692,862 | 9/1987 | Cousin et al. | 364/200 |
| 4,695,944 | 9/1987 | Zandveld | 364/200 |
| 4,777,591 | 10/1988 | Chang | 364/200 |
| 4,794,516 | 12/1988 | Auerbach | 364/200 |
| 5,016,162 | 5/1991 | Epstein | 364/200 |

OTHER PUBLICATIONS

SAB 8086 Family User's Manual, Oct. 1979, MCS-86, entitled "Designing 8086, 8088, 8099 Multiprocessor Systems with the 8289 Bus Arbiter", pp. A112 to A131.

*Primary Examiner*—Thomas C. Lee
*Assistant Examiner*—Eric Coleman
*Attorney, Agent, or Firm*—Hill, Van Santen, Steadman & Simpson

[57] ABSTRACT

In a multi-processor system in which a plurality of microprocessor systems are allocated to a common multiprocessor bus in cyclical fashion in a sequence prescribed by priority characterizing numbers assigned to said systems, the priority allocation of bus access is overlaid by a further method that coordiantes the access fo a microprocessor system to a region storing a common data base in a common memory. One of the microprocessor systems functions as the main processor system and is authorized to up-date the data base and all other microprocessor systems function as subsidiary procesors which can read the data base information. Before its access, every microprocessor system accessing the data base communicates a status signal to the other micro-processor systems, this preventing the main processor system from up-dating the data base while one of the subsidiary processor systems is already reading the data base information.

4 Claims, 2 Drawing Sheets

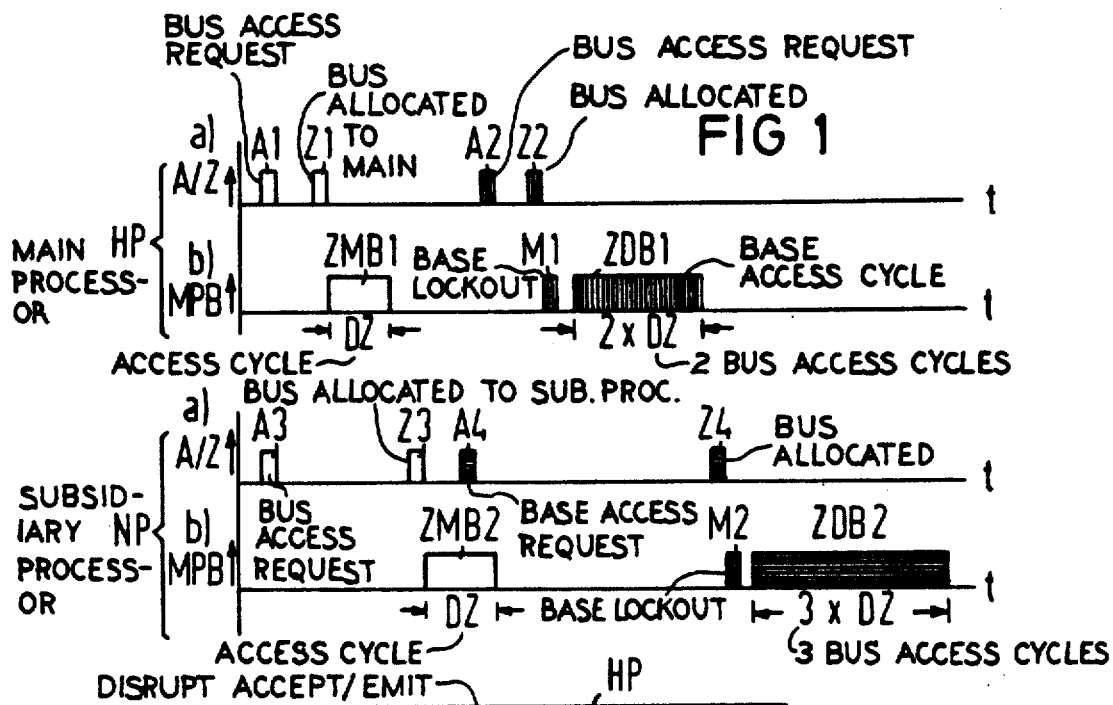
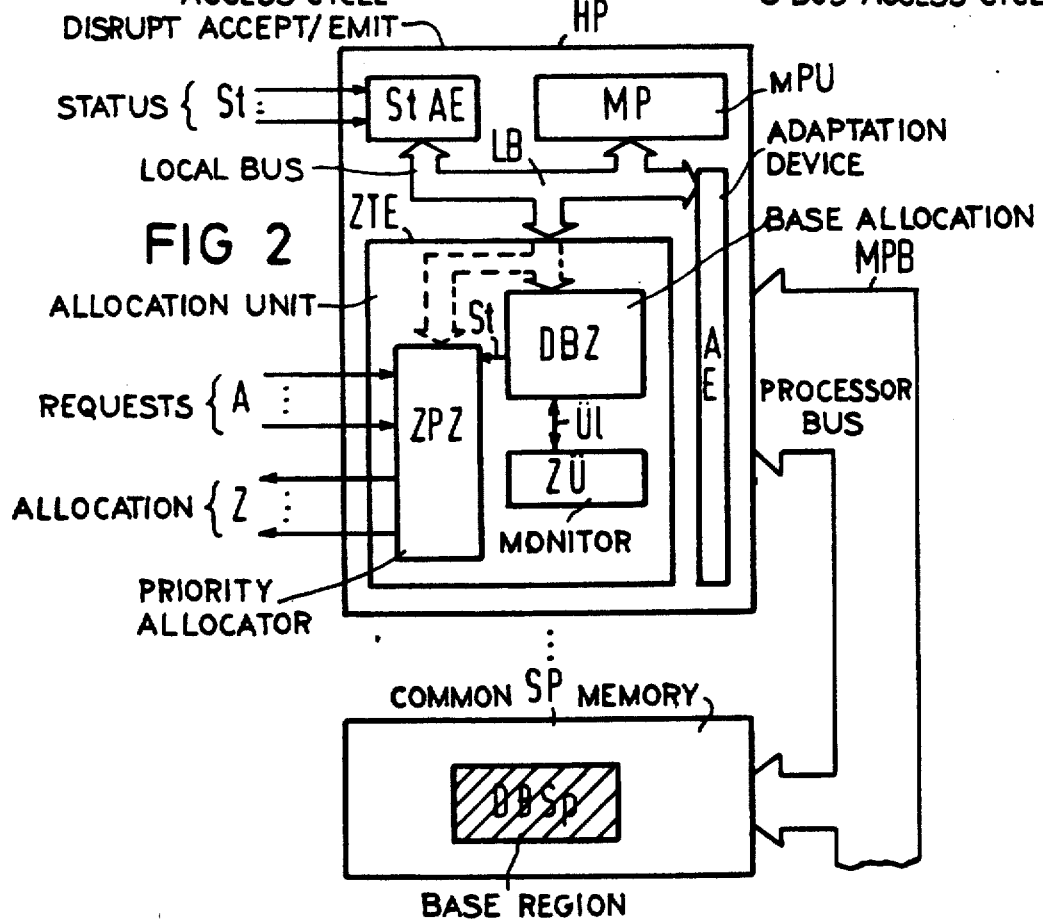

MULTIPROCESSOR SYSTEM WITH SEQUENTIAL PRIORITIZED COMMON MEMORY ACCESS PREVENTING MEMORY UPDATE ACCESS BY ALL PROCESSORS EXCEPT MAIN PROCESSOR

BACKGROUND OF THE INVENTION

The invention is directed to a method for accessing a common or shared memory of a multi-processor system composed of individual microprocessor systems, whereby the individual microprocessors access a common memory base region storing a common data base, with the use of appropriate matching devices, and with a multi-processor bus connected to all microprocessor systems, to allow a microprocessor system to access the common memory only for the duration of a system bus access cycle.

The User manual of the Mikroprozessor SAB 8086 (SAB 8086 Family, Users Manual, October 1979, MCS-86), Appendix AP 51 (A 113-A 131) discloses a multi-processor system wherein three identical microprocessor systems are connected with a common memory and a matching device for the connection of external equipment, via a multi-processor bus having control, address and data lines, and via signal carrying lines for the request and the allocation of the multi-processor bus. In each of the microprocessor systems, a local bus connects the individual system components such as microprocessor, and matching device to the data bus; and connects further devices such as, for example, local memory, etc. to one another. A bus control device is connected to, and is controlled by, the microprocessor to form the connecting element to the control bus. A multi-processor bus allocation device is also connected to the microprocessor, and to all bus allocation devices of the microprocessor system as well as to a priority device. Via the multi-processor bus allocation devices, and the priority device, the multi-processor bus is allocated to a given microprocessor for the duration of a multi-processor bus access cycle in a prescribed sequence, corresponding to the priority number allocated to each microprocessor system. A clock device allocated to each microprocessor system supplies the system components with the required clock information.

When such multi-processor systems are provided for the central controls of telecommunications switching systems, not only must the accesses to the multi-processor bus be coordinated but the accesses of the microprocessor systems to a data base stored in common for all in a corresponding region of the shared memory must also be controlled. Further, the access mode which serves for accesses onto the multi-processor bus which do not serve for up-dating or for reading the data base, dare not be influenced. Since information sets which belong together and are of different size are stored in the data base, a plurality of multi-processor bus accesses may be required for up-dating or reading out this information. Moreover, it must be assured that a read event is not carried out during the up-dating process and vice versa.

SUMMARY OF THE INVENTION

The object of the invention is to specify a method for the selection of a base region in a common memory storing the data base that is based on the known methods of multi-processor bus allocation and which additionally coordinates the accesses to the base region of a common memory of a multi-processor system for collision-free up-dating and reading, and which avoids permanent blockings. This object is achieved by apparatus which allows only one microprocessor to update data in the data base region, and only when this region is not being read by another microprocessor. The other microprocessors may not access the data base region while it is being up-dated. This is accomplished through use of an allocation device and apparatus for generating and recognizing various status signals.

The advantage of the method of the invention is that, in a system wherein every processor system has the multi-processor bus cyclically assigned to it in a sequence prescribed by a priority number, a further method is overlaid that controls the access of the respective microprocessor systems to the base region in the common memory. In the method of the invention, only one of the microprocessor systems, namely the microprocessor system identified as the main processor system, can up-date the data base in the common memory; however, the data base information can be read by all microprocessor systems including the main processor system. For the respective duration of the up-dating or reading of the data base information, the normal multi-processor bus allocation sequencing is interrupted until the region of the common memory storing the data base information has been updated or read.

Subsequently, the multi-processor bus is again cyclically assigned to the individual microprocessor systems in accord with the priority characterizing numbers, insofar as this allocation mode has not been interrupted again by a further access of a microprocessor system to the data base stored in the common memory. Given suddenly occuring disturbances of a microprocessor system currently accessing the data base, the multi-processor bus could be blocked for a longer time or even continuously. In order to avoid this, the duration of the accesses to the data base information is monitored and the multi-processor bus is forcibly released in favor of another microprocessor system when the maximally allowable access duration is exceeded.

In accord with an advantageous development of the invention, disturbed microprocessor systems or microprocessor systems which are waiting can be prevented from accessing the multi-processor bus or the common memory. Despite potential requests of the disturbed microprocessor system, the allocation device in the main processor system prevents the disturbed microprocessor system from accessing both the common multi-processor bus, as well as the common memory, when an information indicating the disrupted status of a microprocessor system is present. Both the information indicating the disruption-free condition as well as the information indicating the disruption condition are communicated to the main processor system via special lines to which all multi-processor systems are connected. A previously disturbed microprocessor system which is subsequently identified as disruption-free is re-integrated into the allocation process in the allocation device in accord with its priority.

The advantage of the circuit arrangement for implementation of the method of the invention, is that this circuit arrangement is implemented in each of the microprocessor systems and each of the microprocessor systems can be utilized as main processor or as subsidiary processor by means of simply setting switches or, respectively, bridges. Thus, only a single type of microprocessor system need be manufactured for different sizes of central controls of telecommunications switching systems and only this single microprocessor system type need be kept on hand for replacing microprocessor systems which are taken out of service.

BRIEF DESCRIPTION OF THE DRAWING

In the following, the method is set forth in greater detail, with reference to a drawing, in which:

FIG. 1 illustrates the method of the invention with reference to flowcharts; and FIG. 2 illustrates the structure of an exemplary arrangement for the implementation of the method of the invention;

DESCRIPTION OF THE PREFERRED EMBODIMENT

Figure 3:
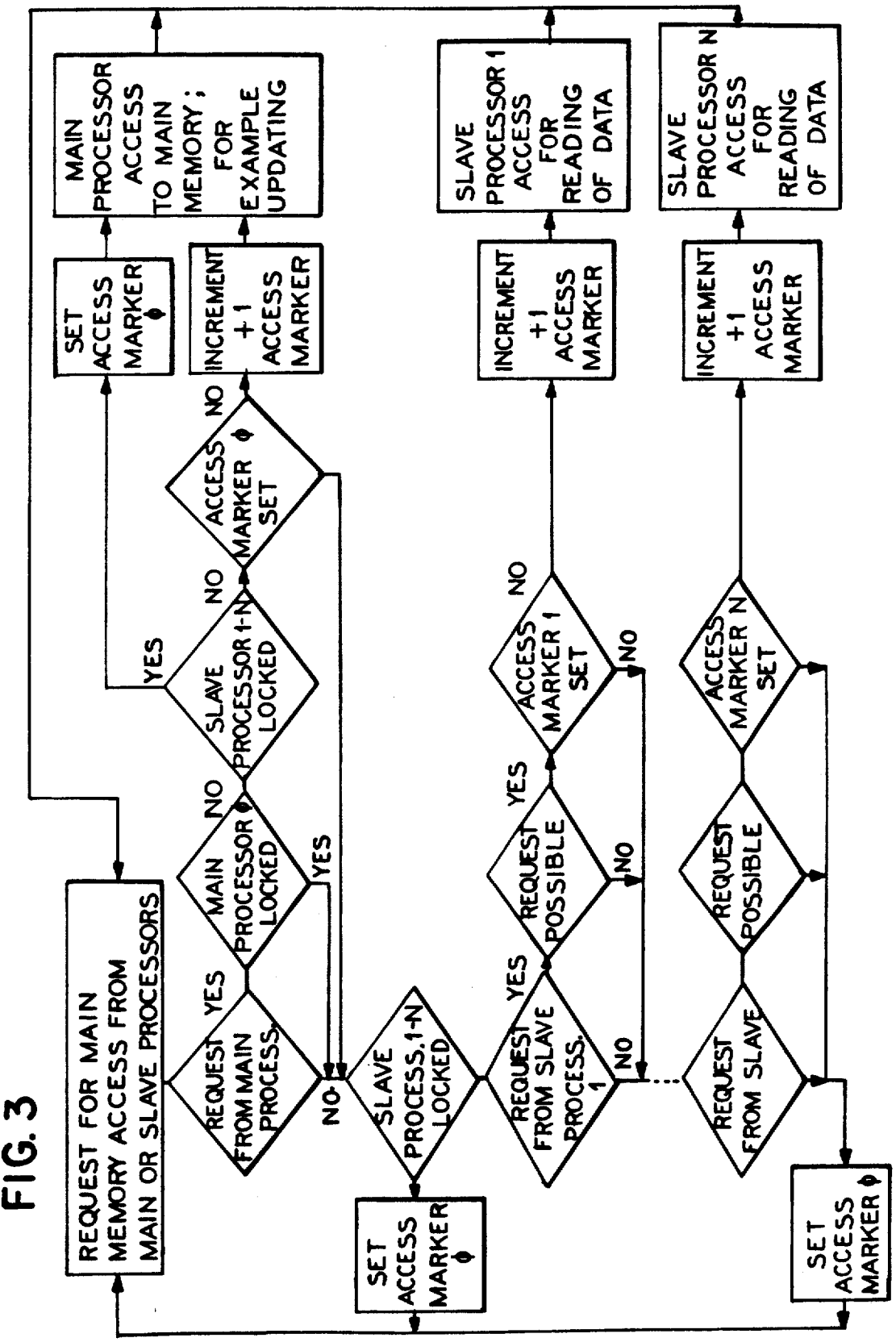
FIG. 3 is a flow diagram illustrating the steps performed in the method of the present invention.

FIG. 1 comprises time flowcharts showing both accesses of the microprocessor systems to the common multi-processor bus MPB, as well as accesses to the base region of the common memory via the multi-processor bus MPB. Execution cycles for a main processor system HP and for a subsidiary processor system NP are shown by way of example. Each of the two microprocessor systems HP, NP has two flowcharts in FIG. 1. The first flowchart a) respectively shows the method steps in time sequence t which precede the access of a multi-processor system to the common multi-processor bus MPB. The second flowchart b) shows status signals which are communicated via the common multi-processor bus MPB before the current access of a multi-processor system to the common multi-processor bus MPB or, respectively, to the base region of the common memory and the actual accesses onto the multi-processor bus MPB or, respectively, to the base region of the common memory. Method steps which control the access of a multi-processor system HP, NP to the base region of a common memory are identified by horizontal or vertical hatching, respectively.

Let it be assumed that at the start of the flowchart the subsidiary processor system NP has just concluded an access onto the multi-processor bus MPB. Bus access requests A1, A3 arrive simultaneously in the multi-processor bus allocation device. The main processor system HP and a subsidiary processor system NP wish to access the common multi-processor bus MPB. As a result of the cyclical allocation corresponding to the priority characterizing number, the main processor system HP receives access to the multi-processor bus MPB as the next microprocessor system. This is communicated to the main processor system HP by means of an allocation information signal Z1, whereupon the main processor system HP accesses the multi-processor bus MPB for the duration of an access cycle DZ. This multi-processor access ZDB1 of the main processor system HP serves the purpose of information exchange of the microprocessor systems with one another or serves the purpose of accessing that region of the common memory which is not occupied by the data base.

Subsequently, the multi-processor bus MPB is allocated to the subsidiary processor system NP whose request A3 for access to the multi-processor bus MPB had not yet been granted, and an appropriate allocation information Z3 is communicated to the subsidiary processing system NP. The subsidiary processor NP immediately accesses the multi-processor bus MPB for the duration of an access cycle DZ. After the end of this multi-processor bus access ZMB2, two requests A2, A4 of both the main processor system HP as well as of the subsidiary processor system, NP are already present, representing the access attempts of both microprocessor systems to access the base region of the common memory via the multi-processor bus MPB.

In accord with the cyclical allocation corresponding to the priority characterizing number, the main processor system HP is granted access to the multi-processor bus MPB and this is communicated to the main processor system HP by means of the allocation information Z2. The main processor system HP immediately accesses the multi-processor bus MPB and transmits a status signal M1 to all other microprocessor systems, which prevents the remaining microprocessor systems from accessing the base region of the common memory.

After this status signal M1 has been sent, the main processor system HP accesses the base region of the common memory via the multi-processor bus MPB, for example accessing it for the duration of two bus access cycles DZ. After the end of this multi-processor bus access ZDB1, the multi-processor bus MPB is allocated to the subsidiary processor system NP in accord with the cyclical allocation corresponding to the priority characterizing number, and the subsidiary processor system NP is informed of this by means of the allocation information Z4. The subsidiary processor system NP immediately accesses the multi-processor bus MPB and sends a status signal M2 to the main processor system HP. This status signal M2 prevents the main processor system HP from accessing the base region of the common memory and prevents it from up-dating the data base; this is prevented as long as the subsidiary processor system NP accesses the base region of the common memory. After the status signal M2 has been delivered, the subsidiary processor system NP selects the base region of the common memory and reads the correspondingly addressed data base information there. The duration of the access ZDB2 to the base region of the common memory is here assumed to be three bus access cycles ZD.

FIG. 2 shows those system components of an arrangement which are needed for the implementation of the method of the invention. The arrangement of the system components is set forth in greater detail with reference to the structure of the main processor system HP, which is representatively selected from the identically constructed microprocessor systems. A local bus LB, arranged in every microprocessor system and composed of control, address and data lines, respectively, connects a microprocessor MP, an adaptation device AE, a disruption accept or, respectively, disruption emission device StAE and an allocation device ZTE to one another. The control of the main processor system HP ensues centrally in the microprocessor realized, for example, with the SAB 80286. In the adaptation device AE controlled by the microprocessor MP, information is both communicated to a multi-processor bus MPB connected to this adaptation device AE, and is also received therefrom. This adaptation device AE sees to the time-suited transfer of the information both to the multi-processor bus MPB as well as to the local bus LB.

The allocation device ZTE has a priority allocating device ZPZ for cyclical allocation of the multi-processor bus MPB in accord with the priority characterizing numbers, a data base allocation device DBZ for the allocation of the access to the base region DBSp of the common memory SP, and a monitoring device ZU which monitors the duration of the accesses to the base region DBSp of the common memory SP. Lines "A" lead directly from all priority allocating devices ZPZ of the subsidiary processor systems NP to the priority allocating device ZPZ of the main processor system HP. The respective subsidiary processor systems NP communicate their requests for allocation of the multi-processor bus NPB on these lines "A". Further, lines "Z" lead from the priority allocating device ZPZ of the main processor system HP to all devices ZPZ of the subsidiary processor systems NP arranged in the multi-processor system. The allocation information are communicated to every subsidiary processor system NP on these lines "Z".

After the receipt of this information, the respective subsidiary processor system NP immediately accesses the common multi-processor bus MPB. Via the local bus LB connected to the priority allocating device ZPZ and shown in broken lines, the microprocessor MP informs this priority allocating device ZPZ regarding which of the microprocessor systems of the multi-processor system are in the disturbed condition or, respectively, disturbance-free status. Disturbed microprocessor systems are excluded from the cyclical multi-processor bus allocation corresponding to the priority characterizing numbers, being excluded therefrom in the priority allocating device ZPZ until an information indicating the disturbance-free condition has been communicated from the microprocessor MP to the priority allocating device ZPZ.

The accesses to the base region DBSp of the common memory Sp are coordinated in the data base allocating device DBZ. Via the local bus LB, the microprocessors MP of the respective microprocessor systems inform the data base allocating device DBZ that the next access to the multi-processor bus MPB serves the purpose of accessing the base region DBSp of the common memory Sp in order to up-date the data base stored there—only by the main processor system HP—or in order to read the data base information—by all microprocessor systems. Before accessing the base region DPSp of the common memory Sp, a status signal is generated in the data base allocating device DBZ and is communicated to the main processor system HP or, respectively, to all subsidiary processor systems NP, via the local bus LB and via the multi-processor bus MPB. This status signal prevents the data base from being up-dated by the main processor system HP while one of the micro-processor systems is reading these data base information out. Since the access to the base region DBSp of the common memory Sp can extend over a plurality of multi-processor bus access cycles, the cyclical allocation corresponding to the priority number—which respectively allocates the multi-processor MPB for only one bus access cycle—must be controlled. Via a control line ST, a control information signal generated in the data base allocating device DBZ is communicated to the priority allocating device ZPZ until the access to the base region DBSp of the common memory Sp of the respective microprocessor system has been concluded. The cyclical multi-processor bus allocation corresponding to the priority numbers is either arrested or carried out in the priority allocating device ZPZ in accord with the control information.

A monitoring device ZU in the allocation device ZTE monitors the duration of the access to the base region DBSp of the common memory Sp. For this purpose, the monitoring device ZU is informed via a line UL of the beginning of the access to the base region DBSp of the common memory Sp.

When, due to a disturbed microprocessor system, the maximum allowable access duration is exceeded, then a corresponding information signal is generated in the monitoring device ZU and is communicated to the device DBZ. On the basis of this information, the current access to the base region DBSp of the common memory Sp is immediately forcibly concluded in the data base allocating device DBZ and the multi-processor bus MPB or, respectively, the base region DBSp of the common memory Sp is allocated to another microprocessor system in accord with the cyclical allocation corresponding to the priority characterizing number. The disturbance accept/emission device StAE of the main processor system HP is connected to the remaining disturbance emission device StAE of all subsidiary processor system NP via a respective line ST. Via these lines ST, the main processor system HP is informed of the disturbance-free status or, respectively, of the disturbed status of all subsidiary processor systems NP by means of appropriate information. These information signals are collected in the disturbance accept device StAE and, given status changes, are communicated to the microprocessor MP of the main processor system HP by means of an appropriate signal, being communicated thereto via the local bus LB. As already set forth, the respective microprocessor system is excluded from the cyclical allocation controlled by the priority characterizing number or is again included therein in response thereto.

All microprocessor systems and the common memory SP are connected to one another via a multi-processor bus MPB constructed of control, address and data lines.

The individual system components can be realized, for example, with the following integrated circuits:

Adaptation device AE: SAB 8287 (Matching to the Data Bus); SAB 8283 (Matching to the Address Bus); 82288 (Bus Control device).

Allocation device ZTE: SAB 82289 (Bus Allocation Device) and of TTL-NOR Gates and TTL-D-flip-flops which are combined in a customer-tailored integrated module.

Disturbance accept or, respectively, emission device StAE: SAB 8254 (Time Monitoring) and TTL trigger circuits.

FIG. 3 illustrates a flow diagram showing the method of the present invention, where the main processor system is allocated a priority identification number 0, and the subsidiary processors have priority identification numbers 1 ... n. Such priority identification numbers are referred to in FIG. 3 as the "access marker". The inhibiting information is generated in the main processor, or in the subsidiary processors, and is used in a series of decision steps for determining how the control branches at the branching points of the flow diagram. All of the inhibiting information is supplied to the common bus, whereby simultaneous inhibition of the main processor and of the subsidiary processors is not possible.

It is apparent that various modifications and additions in the apparatus of the invention may be made by those skilled in the art without departing from the essential features of novelty thereof, which are intended to be defined and secured in the appended claims.

What is claimed is:

1. A method for the selection of a common memory of a multi-processor system composed of a plurality of individual microprocessor systems, said microprocessor systems incorporating a single main processor and at least one subsidiary processor connected by a local bus, a common memory connected to all said microprocessor systems by means of a common multi-processor bus, wherein said individual microprocessor systems respectively access a base region having a common data base in a common memory, in the order of allocated priority characterizing numbers, respectively allocating access to said memory over said multi-processor bus connected to each of said microprocessor systems, a microprocessor system being operative to access said multi-processor bus only for the duration of a system-inherent bus access cycle, the method comprising the steps of:

designating a single one of said microprocessor systems as the main processor system (HP), for controlling all allocations of said multi-processor bus, with the remaining microprocessor systems designated as subsidiary processor systems (NP); whereby said data base stored in said common memory (SP) can only be updated by said main processor system (HP), and information in said data base can be read by all said microprocessor systems, providing allocation means (ZTE) for said main processor system (HP); all said microprocessor systems communicating their bus access requests to said allocation means (ZTE) over a plurality of individual request lines, allocating said multi-processor bus (MPB) cyclically to each of said microprocessor system in a sequence prescribed by said priority characterizing numbers, communicating an information signal representing allocation to every said micro-processor system, communicating an access control status signal from said main microprocessor system to every said subsidiary processor (NP) preceding the access of said main processor system (HP) to the base region (DBSP) for the purpose of updating the data base, preventing the access of all said subsidiary processor systems (NP) to the multi-processor bus (MPB) and to the base region (DBSP) during the updating of the data base by said main processor system which only may update said data base, monitoring the time of said access of said main processor (HP) to the base region (DBSP) with a monitoring means (ZU) controlled by said main processor and concluding said access; allocating said multi-processor bus access to a different subsidiary subsidiary processor systems (NP) in accord with said priority characterizing numbers;

communicating a status signal (M2) from said subsidiary processor system (NP) to said main processor system preceding the access of said subsidiary processor system (NP) to the base region (DBSP) for the purpose of reading the data base information, preventing said access of the main processor system (HP) to the multi-processor bus (MPB) and to the base region (DBSP) for the purpose of updating the data base until all said subsidiary processor systems (NP) with greater priority than the accessing subsidiary processor system (NP) conclude their access to the base region (DBSP) or until said monitoring means (ZU) concludes a current access.

2. The method according to claim 1, including the steps of communicating a fault-indicating disturbance report from a distrubed one of said subsidiary processor systems (NP) to said main processor system (HP), and disconnecting said multi-processor bus (MPB) from said disturbed subsidiary processor system (NP) until the disturbed subsidiary processor system (NP) communicates a report to the main processor system (HP) which indicates a disturbance-free condition.

3. A method according to claim 1, wherein all of said microprocessor systems are identically constructed and all of the microprocessor systems can function either as main or subsidiary processor systems (HP, NP).

4. A method according to claim 1, including the step of allocating priority characterizing numbers to said microprocessor systems in any distribution.

* * * * *